(12) United States Patent
Nichtawitz

(10) Patent No.: US 7,284,948 B2
(45) Date of Patent: Oct. 23, 2007

(54) TURBINE WITH TUBE ARRANGEMENT AND METHOD OF PREVENTING DETACHMENT OF A FLUID FLOW

(75) Inventor: Alois Nichtawitz, Traun (AU)

(73) Assignee: VA Tech Hydro GmbH, Vienna (AT)

( * ) Notice: Subject to any disclaimer, the term of this patent is extended or adjusted under 35 U.S.C. 154(b) by 223 days.

(21) Appl. No.: 10/848,381

(22) Filed: May 19, 2004

(65) Prior Publication Data

US 2005/0002785 A1    Jan. 6, 2005

Related U.S. Application Data

(63) Continuation of application No. PCT/EP03/02777, filed on Mar. 18, 2003.

(30) Foreign Application Priority Data

Apr. 10, 2002   (AU) .............................. A 549/2002

(51) Int. Cl.
*F03B 13/08* (2006.01)
(52) U.S. Cl. .............................. 415/1; 815/3.1; 815/4.5; 815/208.2; 815/211.2; 415/221; 415/222; 415/914; 138/39; 290/52; 290/54
(58) Field of Classification Search ................... 415/1, 415/3.1, 4.3, 4.5, 8, 208.2, 211.2, 218.1, 219.1, 415/220–222, 906, 908, 914; 138/39; 290/43, 290/52, 54
See application file for complete search history.

(56) References Cited

U.S. PATENT DOCUMENTS 1,562,556 A * 11/1925 Harza .......................... 290/52
1,681,706 A    8/1928 Moody
1,769,887 A    7/1930 Moody
2,060,101 A   11/1936 Moody
2,634,375 A *  7/1953 Guimbal ....................... 290/52
2,662,726 A * 12/1953 Thomas ......................... 415/1
2,668,686 A *  2/1954 Thomas .................... 415/211.2
2,949,277 A *  8/1960 Deriaz ..................... 415/208.2
4,352,989 A   10/1982 Atencio
4,441,029 A    4/1984 Kao
4,599,854 A    7/1986 Mayo, Jr.
4,755,690 A    7/1988 Obermeyer
4,940,387 A    7/1990 Horne et al.
5,825,094 A   10/1998 Hess
6,146,096 A * 11/2000 Winkler ..................... 415/220
6,281,597 B1   8/2001 Obermeyer et al.
6,729,843 B1 *  5/2004 Nichtawitz et al. ...... 415/211.2

FOREIGN PATENT DOCUMENTS

GB         810405      3/1957
WO         01/11234    2/2001

* cited by examiner

*Primary Examiner*—Christopher Verdier
(74) *Attorney, Agent, or Firm*—Nixon & Vanderhye, P.C.

(57) ABSTRACT

Turbine system including a turbine and a tubular arrangement having an exit opening. The tubular arrangement is arranged on a downstream side of the turbine. At least one flow controlling device at least partially prevents a fluid flow through the tubular arrangement from becoming detached from the tubular arrangement. The at least one flow controlling device is positioned within the fluid flow and in an area of the exit opening. The turbine system is configured to operate efficiently in an environment wherein at least an upper edge of the exit opening is arranged above a downstream liquid level.

40 Claims, 4 Drawing Sheets

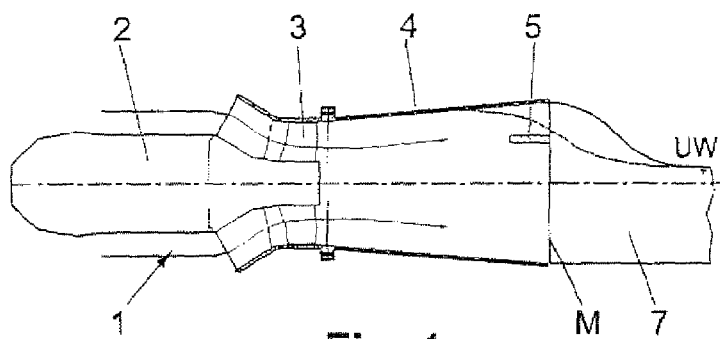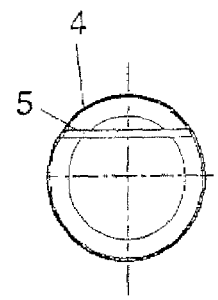
Fig. 1
Fig. 1A
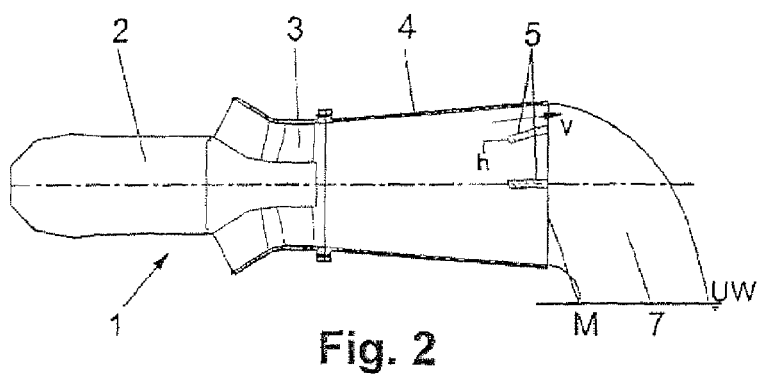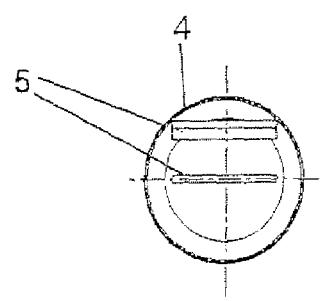
Fig. 2
Fig. 2A

TURBINE WITH TUBE ARRANGEMENT AND METHOD OF PREVENTING DETACHMENT OF A FLUID FLOW

CROSS-REFERENCE TO RELATED APPLICATIONS

The instant application is a continuation of International Application No. PCT/EP03/02777 filed on Mar. 18, 2003 and published as International Publication WO 03/085255 on Oct. 16, 2003, the disclosure of which is hereby expressly incorporated by reference hereto in its entirety. The instant application also claims priority under 35 U.S.C. § 119 of Austrian Application No. A 549/2002 filed on Apr. 10, 2002.

BACKGROUND OF THE INVENTION

1. Field of the Invention

The present invention relates to a turbine or a turbine-generator unit having a tube connected to the turbine downstream for operation with a liquid level which is low or absent downstream of the turbine, and a turbine-generator module comprising a number of turbine-generator units of this type. The invention also relates to the use of a turbine or turbine-generator unit of this type and a method for operating a turbine or turbine-generator unit through which liquid can flow, a method for operating a plant for generating electrical energy, a method for converting a structure for retaining a liquid medium into a device for generating electrical energy, and a method for generating electrical energy at a structure for retaining a liquid medium.

2. Description of the Prior Art

A tube, generally a suction tube, of a turbine or turbine-generator unit in practice always has to open out into the tailwater and must never spray into the open air, since if it does so, particularly in the case of suction tubes with a considerable divergence, the discharge jet can become detached from the suction tube, which reduces the hydraulic efficiency and therefore also the plant efficiency of a turbine-generator unit of this type considerably, to an economically unacceptable level. For this reason, attempts should be made to avoid such a situation in practice.

For design reasons, and in this context in particular, when existing dam structures are being used, it is, however, sometimes not possible to satisfy this condition, since the tailwater level is too low from the outset. Therefore, in a plant of this type, it has hitherto been impossible to install an efficient turbine or turbine-generator unit for generating electrical energy.

SUMMARY OF THE INVENTION

Therefore, the present invention provides a turbine or turbine-generator unit which can be operated with high hydraulic efficiency even if its tube connected downstream does not open out into the tailwater or does so only partially and which can nevertheless be constructed very efficiently and with a simple design.

According to the invention, there is provided an arrangement which can at least partially prevent the flow from becoming detached from the tube. An arrangement of this type prevents the flow from becoming detached in the tube of the turbine or turbine-generator unit which is connected to the turbine and thereby prevents a drop in the hydraulic efficiency. The plant efficiency, which is composed of the mechanical efficiency, which is substantially determined by friction losses in the bearings, the hydraulic efficiency, which is substantially determined by the turbine efficiency, and the electrical efficiency of the generator, can, as a result, likewise be kept at a high level. This is extremely important for economic reasons.

Therefore, a turbine or turbine-generator units of this type can be used even if, for example, for design reasons, it is not possible for the tube to open out completely into the tailwater, as has hitherto been required. This makes it possible to retrofit even existing dam installations with a liquid level which is low or absent downstream of the turbine with turbine-generator units for the generation of electrical energy without the design of the dam installation itself being altered.

The inventive concept can be used very particularly advantageously for turbines with suction tubes, since in practice, mostly for efficiency reasons, the tube used is generally a suction tube, and in this case the phenomenon whereby the flow through the divergent suction tube becomes detached, in particular in the case of strongly divergent suction tubes, leads to problems particularly frequently.

For space reasons, it is often expedient for the turbine to be designed with axes of rotation which are substantially horizontal or inclined with respect to this horizontal, in which case the turbine advantageously has a turbine rotor, on which a plurality of turbine blades which are arranged rigidly on the turbine rotor are arranged, resulting in an arrangement which is particularly simple to implement.

A very simple and, at the same time, very effective arrangement for preventing the flow of liquid from becoming detached is a flow body. A flow body of this type is simple to produce and is very simple to implement in design terms.

The efficiency of the flow body can be increased if it is arranged in the tube, preferably in the region of the downstream end of the tube. The phenomenon of the flow becoming detached generally starts at the end of the tube, and consequently the flow body is advantageously also used at that location.

A very particularly simple embodiment without any loss of efficiency results if the flow body is designed as at least one rib which can be arranged substantially horizontally, vertically or also with any desired inclination. A rib, i.e., in principle a simple piece of sheet metal, can be produced and installed particularly easily and effectively.

If a plurality of ribs are used, the distance between two ribs can be calculated substantially according to the formula $v \geq \sqrt{g \cdot h}$, where "v" is the flow velocity, "g" is the acceleration due to gravity, and "h" is the distance between two ribs. This likewise results in a simple method for predetermining the number of ribs required.

To increase the effectiveness of the flow body still further, it is also conceivable for a rib to be arranged inclined with respect to the flow, so that a local nozzle effect, which makes it significantly more difficult for the flow to become detached, is produced in part of the suction tube.

A further highly advantageous embodiment of a flow body is a pear-shaped body which is arranged concentrically in the tube and is held in the tube by a number of supporting blades. A body of this type is likewise simple to produce and is favorable and simple in design terms to implement.

The most simple design, making it highly advantageous, is an arrangement in which the tube, in the operating position, in the state in which there is no medium flowing through it, at least partially opens out into the open air, so that there is no need for any expensive linings or similar structures.

The advantage of a turbine according to the, invention becomes particularly apparent in installations where the tube, in the state in which there is no medium flowing through it, in its operating position, with respect to the tailwater level, projects entirely into the open air, although intermediate ranges of between approximately 25%, approximately 50% and approximately 75% coverage are also conceivable. Dam installations of this type can now, for the first time, be used to generate electrical energy without any restriction to the hydraulic efficiency.

A turbine or turbine-generator unit according to the invention is advantageously used in a turbine-generator module, comprising a plurality of turbine-generator units which are arranged next to and/or above one another and are connected to one another, for operation with a liquid level which is low or absent downstream of the turbine-generator unit. In a particular design variant, the tubes of the turbine-generator units which are arranged next to one another in a row at least in part open out into the open air, and the arrangement for preventing the flow from becoming detached acts on all the tubes in this row.

For design reasons and/or cost reasons, it is also conceivable to provide a single tube for a number of turbine-generator units of the turbine-generator module. Therefore, under certain circumstances, the turbine-generator module can be more compact, more lightweight and of simpler design.

A turbine, turbine-generator unit or turbine-generator module according to the invention can very particularly advantageously be used in an at least partially existing dam installation with a tailwater level which is low or absent, since in this case no design changes or only insignificant design changes have to be made to the dam installation for the concept to be usable.

The turbine-generator module is particularly advantageously operated for generation of electrical energy between two stationary structures of the dam installation, so that the existing structures can be optimally utilized.

The inventive concept of maintaining the flow in the tube of the turbine allows such a turbine to be operated as a result of the flow of the liquid immediately downstream of the tube, at least in sections, being maintained above the tailwater level, so that the hydraulic efficiency of the turbine which is required for energy generation is achieved. This makes it possible for the flow to be maintained in a very wide range from approximately 10%, approximately 50%, approximately 100%, approximately 300% and even more than approximately 500% above the liquid level.

A turbine-generator unit according to the invention or a plant for generating electrical energy having at least one turbine-generator unit or at least one turbine-generator module can, for the first time, be operated particularly favorably without any loss of efficiency even if the liquid level at a distance downstream of the tube is kept in a range from below the bottom edge of the tube to at most directly below the top edge of the tube. In this way, the flow in the tube is at least partially prevented from becoming detached.

With a turbine, turbine-generator unit or turbine-generator module according to the invention, it is for the first time possible for a structure which retains a liquid medium to be converted in a particularly simple and advantageous way (and without losses of efficiency) into a device for generating electrical energy. The system can account for the level of the medium downstream of the structure and the level of the medium upstream of the structure, which is higher than the level of the medium downstream of the structure. At least one turbine-generator module can be produced to operate in this environment. The design and efficiency of the turbines and/or generators can be matched to the levels which have been determined, and the flow of the medium immediately downstream of the tube, at least in sections, can be maintained above the level of the medium downstream of the structure. Using such a system, the flow can be at least partially prevented from becoming detached from the tube, so that the hydraulic efficiency of the turbine which is required for energy generation is achieved.

The same is true of a method for generating electrical energy at a structure for retaining a liquid medium, the medium having a level which is low or absent downstream of the structure.

The invention also provides for a turbine system which comprises a turbine and a tubular arrangement comprising an opening region. The tubular arrangement is connected to a downstream side of the turbine. A flow arrangement at least partially prevents a fluid flow from becoming detached from the tubular arrangement. The flow arrangement is positioned within the fluid flow and in an area of the opening region. The turbine system is configured to operate at least one of in an environment wherein there is a low liquid level downstream of the turbine and in an environment wherein there is no liquid level downstream of the turbine.

The tubular arrangement may be a suction tube. An axis of rotation of the turbine may be arranged one of on a plane which is substantially horizontal and arranged on a plane which is inclined with respect to a horizontal plane. The turbine may comprise a turbine rotor and a plurality of turbine blades rigidly arranged on the turbine rotor. The flow arrangement may comprise a flow body. The flow body may be arranged in an area of a downstream end of the tubular arrangement. The flow arrangement may comprise at least one rib. The at least one rib may be arranged substantially horizontally. The flow arrangement may comprise at least one flow body that is arranged substantially vertically. The flow arrangement may comprises at least one flow body that is arranged substantially inclined with respect to one of a horizontal plane and a vertical plane.

The flow arrangement may comprise two ribs arranged at a distance from one another, whereby the distance between the two ribs is substantially calculated using a formula $v \geq \sqrt{g \cdot h}$, wherein "v" is a flow velocity, "g" is an acceleration due to gravity, and "h" is the distance between two ribs.

The flow arrangement may comprise at least one rib that is arranged at an angle that is inclined with respect to the fluid flow.

The flow arrangement may comprise at least one pear-shaped body arranged concentrically in the tubular arrangement. The at least one pear-shaped body is supported in the tubular arrangement by a plurality of support blades.

The tubular arrangement at least partially opens out into open air.

The turbine system may be arranged in an operating position relative to a tailwater level such that at least approximately 25% of an outlet cross-sectional area of the tubular arrangement is arranged above the tailwater level. The turbine system may be arranged in an operating position relative to a tailwater level such that at least approximately 50% of an outlet cross-sectional area of the tubular arrangement is arranged above the tailwater level. The turbine system may be arranged in an operating position relative to a tailwater level such that at least approximately 75% of an outlet cross-sectional area of the tubular arrangement is arranged above the tailwater level. The turbine system may be arranged in an operating position relative to a tailwater level such that at least approximately 100% of an outlet cross-sectional area of the tubular arrangement is arranged above the tailwater level.

The invention also provides for a turbine-generator unit comprising the turbine system described above and a generator driven by the turbine, wherein the turbine-generator unit is configured to operate in an environment wherein one of there is no liquid level and a liquid level downstream of the turbine-generator unit is a low liquid level.

The invention also provides for a turbine-generator module comprising a plurality of turbine-generator units of the type described above, wherein the plurality of turbine-generator units is arranged one of next to each other and one above another, and wherein the turbine-generator module is configured to operate in an environment wherein one of there is no liquid level and a liquid level downstream of the turbine-generator module is a low liquid level.

The tubular arrangements of the turbine-generator units may be arranged in a row next to one another, whereby each of the tubular arrangements open out at least partially into the open air.

The turbine-generator module may further comprise a closure device configured to close off at least one of the turbine-generator units so that liquid cannot flow therethrough.

The invention also provides for a turbine-generator module comprising a plurality of turbine-generator units arranged one of next to each other and one above another, each turbine-generator unit comprising a turbine and a generator driven by the turbine, at least one tubular arrangement comprising an opening region, the at least one tubular arrangement being connected to at least two of the plurality of turbine-generator units, and a flow arrangement that at least partially prevents a fluid flow from becoming detached from the at least one tubular arrangement, wherein the flow arrangement is positioned within the fluid flow and in an area of the opening region.

The invention also provides for a turbine-generator module of the type described above and which further comprises a closure device configured to close off at least one of the turbine-generator units so that liquid cannot flow therethrough.

The invention also provides for a method of generating electrical energy with the turbine system of the type described above, wherein the method comprises arranging the turbine system in a dam installation and causing rotation the turbine.

The dam installation may comprise one of a weir installation and a lock.

The invention also provides for a method of generating electrical energy with the turbine system of the type described above wherein the method comprises arranging the turbine system in an existing dam installation and causing rotation the turbine.

The invention also provides for a method of generating electrical energy with the turbine-generator module of the type described above wherein the method comprises arranging the turbine-generator module between two stationary structures in a dam installation and causing rotation the turbines.

The method may further comprise at least one of raising and lowering the turbine-generator module with a lifting device.

The invention also provides for a method for operating a turbine system wherein the method comprises connecting a tubular arrangement to a downstream end of a turbine, causing a fluid flow through the tubular arrangement, maintaining the fluid flow within the tubular arrangement at least partially above a tailwater level immediately following the tubular arrangement, positioning a flow arrangement within the fluid flow and in an area of an opening region of the tubular arrangement, and at least partially preventing, with the flow arrangement, the fluid flow from becoming detached from the tubular arrangement.

The method may further comprise maintaining the fluid flow immediately downstream of the tubular arrangement at least approximately 10% above the tailwater level.

The method may further comprise maintaining the fluid flow immediately downstream of the tubular arrangement at least approximately 50% above the tailwater level.

The method may further comprise maintaining the fluid flow immediately downstream of the tubular arrangement at least approximately 100% above the tailwater level.

The method may further comprise maintaining the fluid flow immediately downstream of the tubular arrangement at least approximately 300% above the tailwater level.

The method may further comprise maintaining the fluid flow immediately downstream of the tubular arrangement at least approximately 500% above the tailwater level.

The invention also provides for a method for operating a turbine system, wherein the method comprises arranging a tubular arrangement on a downstream end of a turbine, causing a fluid flow through the tubular arrangement, maintaining at least a top edge of the tubular arrangement above a tailwater level that follows an opening region of the tubular arrangement, positioning a flow arrangement within the fluid flow and in an area of the opening region, and at least partially preventing, with the flow arrangement, the fluid flow from becoming detached from the tubular arrangement.

The invention also provides for a method for generating electrical energy with a turbine-generator unit, wherein the method comprises causing a fluid flow through a tubular arrangement of the turbine-generator unit, maintaining at least a top edge of the tubular arrangement above a tailwater level that follows an opening region of the tubular arrangement, positioning a flow arrangement within the fluid flow and in an area of the opening region, and at least partially preventing, with the flow arrangement, the fluid flow from becoming detached from the tubular arrangement.

The invention also provides for a method of converting a structure which retains a liquid medium into a structure which also generates electrical energy, wherein the method comprises determination a first level of the liquid medium downstream of the structure, determination a second level of the liquid medium upstream of the structure, the second level being higher than the first level, arranging at least one turbine-generator module in an area of the structure, wherein the at least one turbine-generator module comprises a plurality of turbine-generator units arranged at least one of next to each other and above one another, each of the turbine-generator units comprising a generator, a turbine, and a tube connected to a downstream end of the turbine, matching, to predetermined levels, a design and efficiency of at least one of the turbines and the generators, maintaining a flow of the liquid medium, at least in sections, immediately downstream of the tubes such that the flow is at least partially above the first level, positioning a flow arrangement within the flow and in an area of an opening region of each of the tubes, and at least partially preventing, with each flow arrangement, the flow from becoming detached from the tubes.

The invention also provides for a method of generating electrical energy at a structure which retains a liquid medium, wherein the method comprises arranging at least one turbine-generator module in an area of the structure, wherein the at least one turbine-generator module comprises a plurality of turbine-generator units arranged at least one of next to each other and above one another, each of the turbine-generator units comprising a generator, a turbine, and a tube connected to a downstream end of the turbine, operating the turbine-generator module by allowing a flow of the liquid medium through the turbines, positioning a flow arrangement within the flow and in an area of an opening region of each of the tubes, at least partially preventing, with each flow arrangement, the flow from becoming detached from the tubes, and transmitting electrical energy from each generator to a power supply network.

The invention also provides for a turbine system comprising a turbine and a tubular arrangement comprising an exit opening. The tubular arrangement is arranged on a downstream side of the turbine. At least one flow controlling rib at least partially prevents a fluid flow through the tubular arrangement from becoming detached from the tubular arrangement. The at least one flow controlling rib is positioned within the fluid flow and in an area of the exit opening. The turbine system is configured to operate efficiently in an environment wherein at least an upper edge of the exit opening is arranged above a downstream liquid level.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein:

FIGS. 1, 1A, 2, 2A, 3, 3A, 4 and 4A show a front view (FIGS. 1-4) and a side view (FIGS. 1A-4A) of a turbine-generator unit with suction tube in a number of design variants;

DETAILED DESCRIPTION OF THE PRESENT INVENTION

Figure 3:
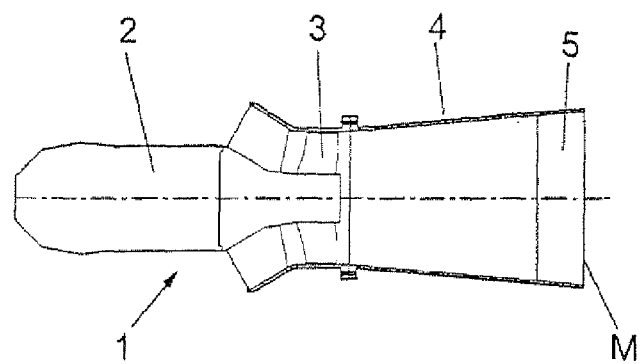

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

FIGS. 1 and 1A show a turbine-generator unit 1 in its operating position, having a generator 2 and a turbine 3 which drives the generator 2. The flow through the turbine-generator unit 1 is indicated by the two arrows. A divergent suction tube 4, which opens out into a tailwater UW, is connected in a known manner to the turbine-generator unit 1. In this example, however, the tailwater level UW is below the top edge of the suction-tube opening M, and accordingly, in the state in which there is no medium flowing through it, the suction tube 4 opens out partially into the open air. In order now to prevent the discharge jet 7 from becoming detached from the suction tube 4, as indicated by the dashed line, which, as is known, would considerably reduce the efficiency of the turbine-generator unit 1, an arrangement for preventing the flow in the suction tube 4 from becoming detached, in the form of a horizontal rib 5, is arranged in the opening region of the suction tube 4. As can be seen from the side view in FIG. 1A, the rib 5 in this case extends over the entire width of the suction tube 4. As a result, the discharge jet 7 is discharged over the entire cross section of the suction tube 4, even though the opening region of the suction tube 4 is not completely covered by the tailwater UW, as is required in conventional arrangements.

As an alternative to a suction tube 4 as shown in FIG. 1, which is characterized by a divergent change in cross section, it is also possible to use a simple tube of any desired cross section. Arrangements of this type are well known and it is therefore also known that in arrangements of this type a lower efficiency has to be accepted from the outset. Experience has shown that with divergent suction tubes hydraulic efficiencies of approximately >80% can be achieved, whereas with simple tubes efficiencies of typically approximately <60% can be achieved.

In the context of the present invention, the term tube is to be understood as meaning any formation of any length with a cavity whose cross section and/or shape is constant or variable and which includes at least one inlet opening and at least one outlet opening.

Of course, the flow bodies according to the invention are also equally suitable for turbines with tubes connected downstream, such as for example suction tubes, without generators. For example, these can be used in installations where the turbines drive a generator arranged elsewhere via suitable arrangements.

FIGS. 2 and 2A now show the same turbine-generator unit 1 with suction tube 4 as that shown in FIG. 1. However, in this example the discharge jet 7 sprays out completely into the open air, i.e., in the operating position the tailwater level UW is below the bottom edge of the suction-tube opening M. In extreme cases, there would even be no liquid level at all downstream of the turbine or tube. In order, once again, to prevent the flow from becoming detached, with all its negative consequences, in this exemplary embodiment there are two horizontal ribs 5, arranged one above the other. These devices constitute flow bodies. However, in this case, they do not extend over the entire width of the suction tube 4. By way of example, the ribs 5 can be arranged in such a way that the relationship $v \geq \sqrt{g \cdot h}$, where "v" is the flow velocity, "g" is the acceleration due to gravity, and "h" is the distance between the two ribs, is satisfied. Moreover, in this case one of the ribs 5 (e.g., the upper rib) is additionally in part also arranged inclined with respect to the flow passing through the suction tube 4, which likewise improves the efficiency of the ribs 5.

Figure 3A:
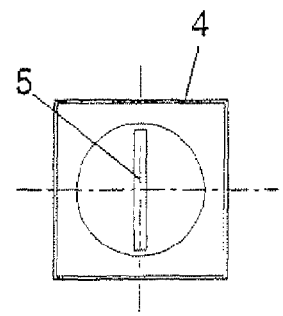

FIGS. 3 and 3A show a further exemplary embodiment of a turbine-generator unit 1. In this case, the suction tube 4 changes from a round cross section in the turbine region into a rectangular or, as in this case, square-shaped suction-tube opening M, as is generally the case in practice. In this example, the rib 5 is arranged generally vertically.

Of course, the ribs 5 can be in any desired arrangement and can of course also be of any desired form. For example, they may be in the form of an airfoil or a simple cuboidal shape, provided that the desired effect, namely that of preventing the flow from becoming detached in the suction tube, is achieved as a result. Of course, the ribs 5, can be arranged in a rotated and/or an angular orientation through any desired angle about the longitudinal axis of the turbine-generator unit 1. They can, for example, be diagonally arranged ribs 5. The arrangement can also be any desired mixture of horizontal, vertical and rotated and/or angled ribs 5. These ribs may, of course, also be of any desired length, they may extend over part or all of the width of the suction tube 4, and if necessary, as shown in, e.g., FIG. 2, may also be positioned at an inclination.

Figure 4:
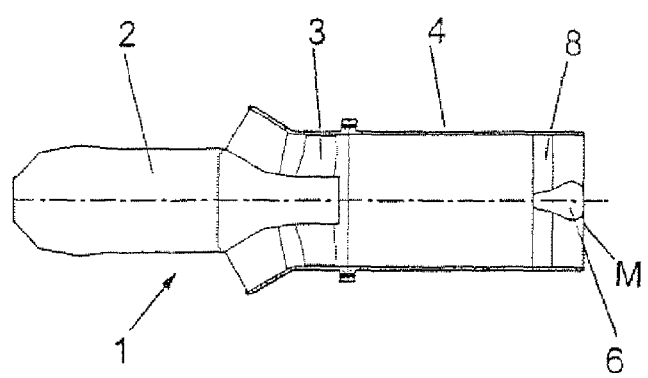
Figure 4A:
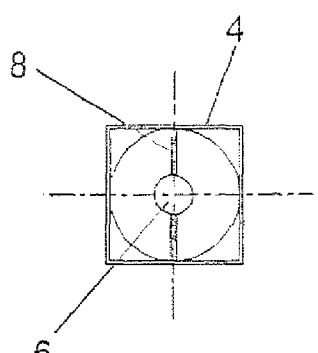

FIGS. 4 and 4A now shows a further possible way of preventing the flow in the suction tube 4 from becoming detached. In this example, the divergence of the suction tube 4 of the turbine-generator unit 1 is produced only by the change in cross section over the length of the suction tube 4. In this case, the round cross section in the turbine region merges into a square cross-section at the suction-tube opening M. The side length of the square can correspond to the diameter of the suction tube 4 in the turbine region, which can correspond to the most compact arrangement of a turbine-generator unit 1 with suction tube 4. The flow body provided in this case is a concentrically arranged, pear-shaped body 6 in the opening region of the suction tube 4. The body 6 is held in the suction tube by two supporting blades 8. However, the supporting blades 8 could also be designed as ribs 5 as shown in the embodiments illustrated in FIGS. 1, 1A, 2, 2A, 3 and 3A, so that they also, at the same time, function as an additional flow body.

The required axial extent of the flow bodies is substantially dependent on the divergence or length of the tube, on the flow velocity of the liquid medium, on the height of the tailwater level UW or the level difference between the top water and tailwater UW, and can be adapted to match the specific conditions. However, practical tests have shown that flow bodies in the region of the opening, i.e. approximately in the final third of the tube, are sufficient.

It will be clear that it is impossible to list all the possible embodiments and combinations of suitable flow bodies in the opening region of the tube. What is essential for the invention, as is clear from the description, is the effect of these flow bodies rather than their precise configuration. In particular, the present invention encompasses all possible embodiments of flow bodies of this type.

Figure 5:
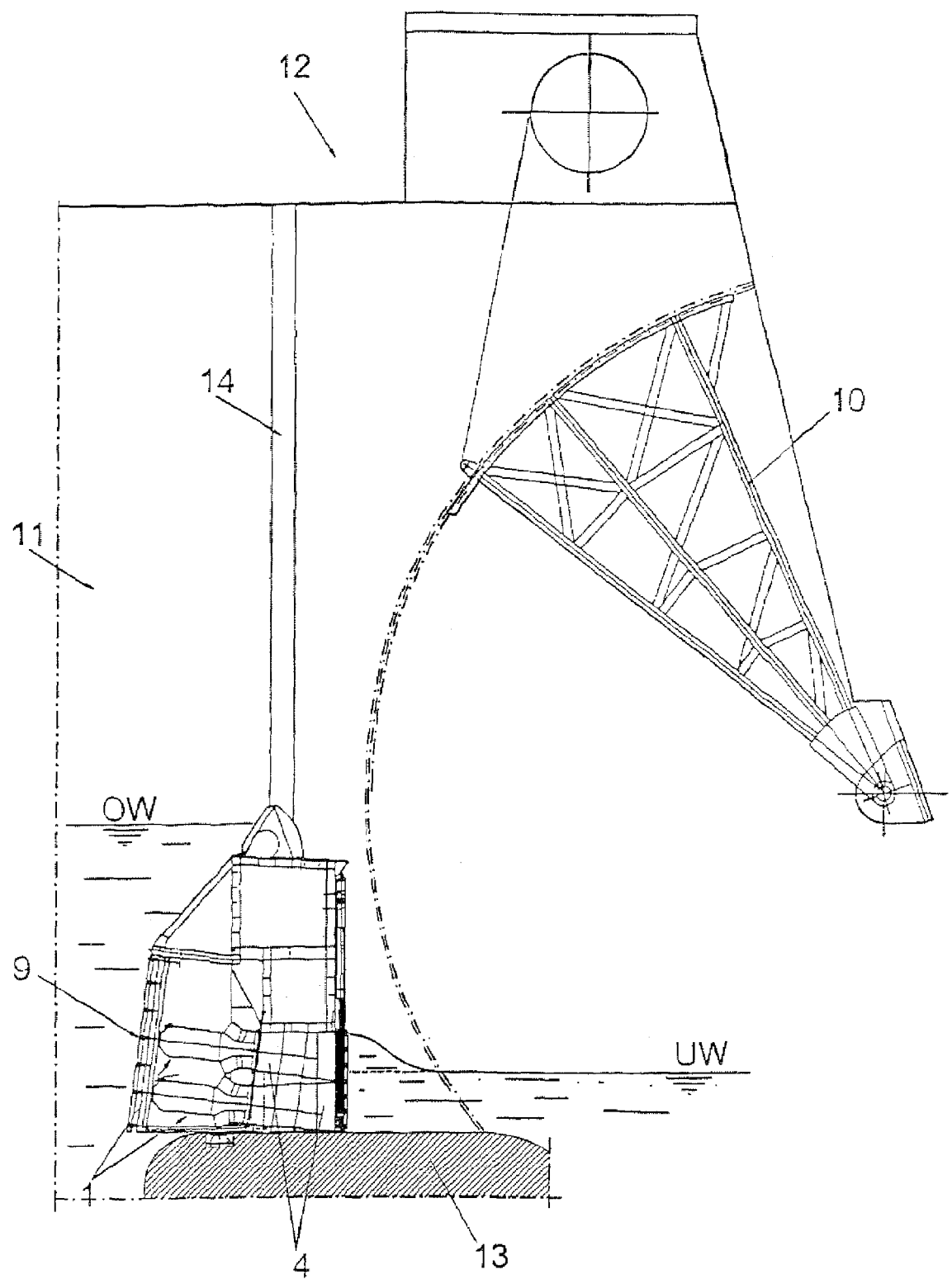
FIG. 5 shows an example of a dam installation having a turbine-generator module.

FIG. 5 shows part of a dam installation 12 having a number of stationary structures, in this case piers 11. Arranged between the piers 11 is a turbine-generator module 9. The module 9 includes a number of turbine-generator units 1 arranged next to and/or above one another with longitudinal axes which are slightly inclined with respect to the horizontal. A turbine-generator module 9 of this type may also be arranged in such a manner that it can be raised and lowered, in which case a lifting device, e.g. a crane, which is not shown, may be provided in order to raise and lower the module. The turbine-generator module 9 may also be guided in a guide 14, which is only generally indicated in the figure. The dam installation 12 shown here also has a rotatably mounted weir gate 10 which can be closed if necessary. This can occur, for example, in situations in which the turbine-generator module 9 is being raised.

The dam installation 12 is generally used to maintain a certain top water level OW. The tailwater level UW can either be a natural result or can also be controllable.

In the example shown in FIG. 5, the weir crest 13 of the dam installation 12 is so high that the suction tubes 4 of the upper row of the turbine-generator units 1, in their operating position, spray partially into the open air, and in this example the tubes of the upper row of the turbine-generator units 1 do not open out completely into the tailwater UW, as indicated by the dashed line. By using a flow body as described in FIG. 1 to 4, these turbine-generator units 1 can now also be used in dam installations 12 of this type, which would hitherto have only been possible with in some cases very considerable losses in efficiency.

Furthermore, the turbine-generator module 9 may comprise closure devices (not shown here), by way of which some and/or all of the turbine-generator units 1 can be closed off so that the liquid cannot flow through the turbine-generator units 1. This situation could arise, for example, if the top water level OW becomes too low and the damming function of the dam installation can no longer be ensured. In this case, the turbine-generator module 9 can be raised out of the waterway for, e.g., maintenance or in the event of a flood or in order to control the quantitative flow.

A situation of this nature, in which the tailwater level UW is very low or absent altogether, may arise in particular in existing dam installations 12 which have hitherto only been used to maintain a predetermined liquid level and are now also to be used to generate electrical energy. Hitherto, converting dam installations 12 of this type into installations for generating electrical energy has been impossible or has involved very considerable levels of outlay, since conventional tubes, such as for example suction tubes 4, which spray completely or partially into the open air would mean a considerable loss of efficiency. This would in turn make the installation uneconomical. By using the flow bodies according to the invention it is now possible for the first time for even existing dam installations 12 of this type to be converted into installations for generating electrical energy with an acceptable level of outlay.

For this purpose, by way of example, closure members which are present between two piers 11 are replaced by a turbine-generator module 9 as illustrated for example in FIG. 5. The turbine-generator module 9 can be matched to the predetermined levels and the existing structures of the dam installation 12, so that an optimum efficiency can be achieved. The suction tubes 4 of the turbine-generator units 1, which open out at least partially into the open air, are equipped with flow bodies according to the invention, so that the flow does not become detached in the opening region of the suction tubes 4, and full efficiency of the system can be exploited.

Figure 6:
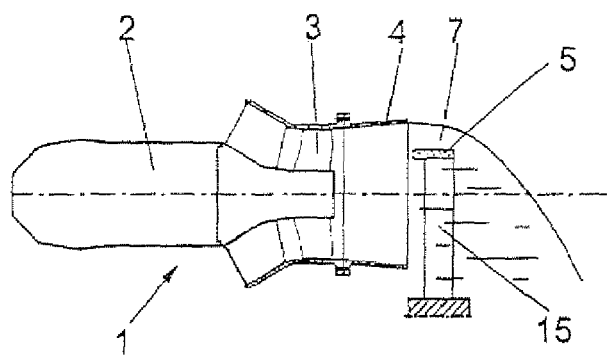
FIGS. 6 and 6A show a front view and side view respectively of a design variant of the turbine-generator with an external flow body.
Figure 6A:
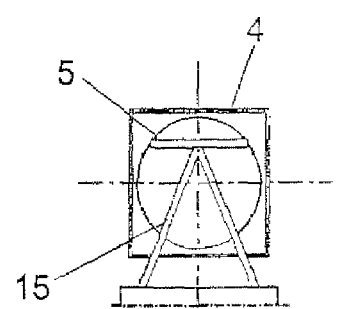

FIGS. 6 and 6A also shows a further possible exemplary embodiment of a turbine-generator unit 1 with a generator 2 and a turbine 3, to which a short suction tube 4 is connected. In this case, an arrangement for preventing the flow in the suction tube 4 from becoming detached is arranged directly downstream of the suction tube 4, as seen in the direction of flow. In this specific example, this arrangement comprises a horizontal rib 5, which is held in the flow of the discharge jet 7 by a supporting construction or arrangement 15. This example shows, in particular, that the arrangement does not necessarily have to be arranged in the suction tube 4 or tube, but rather, may also be located outside it and/or separated therefrom.

Figure 7:
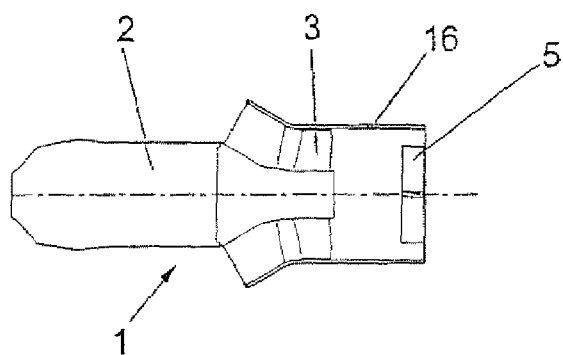
FIGS. 7 and 7A show front and side views respectively of a design variant without an independent tube.
Figure 7A:
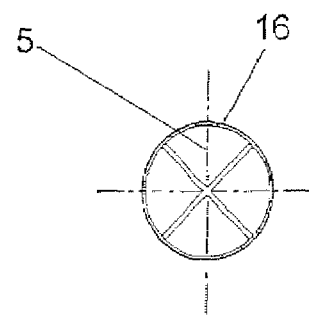

In the examples shown in FIGS. 1, 1A, 2, 2A, 3, 3A, 4, 4A, 5, 6 and 6A, the turbine housing, in which the turbine 3 runs, and the tube connected to the turbine 3 are separate components which, as indicated in the Figures, are connected to one another. This can occur, for example, by way of a flanged connection. It can now be seen from FIGS. 7 and 7A that the tube does not necessarily have to be an independent component, but rather, it is also possible for the turbine housing 16 to be widened into the shape of a tube at the downstream end, and of course also into the shape of a suction tube, so that it fulfills the same function as a separate, connected tube. Of course, as described above, it is then possible for an arrangement for preventing the flow in the tubular widening from becoming detached. This can, for example, take the form of two ribs 5 which are rotated and/or angularly oriented with respect to the horizontal or vertical, and can be arranged in the tubular widening portion of the turbine housing.

Even if the exemplary embodiments only show variants with divergent tubes or tubes with a constant cross section, other tubes, such as for example a convergent tube (i.e., a tube with a decrease in cross section) or an alternately divergent, convergent or constant tube, are also, of course, conceivable.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed:

1. A turbine system operable at least one of in an environment in which there is a low liquid level and an environment wherein there is no liquid level downstream of a turbine, the system comprising:
   the turbine;
   a tubular arrangement comprising an opening region; the tubular arrangement being connected to a downstream side of the turbine,
   a flow arrangement that at least partially prevents a fluid flow from becoming detached from the tubular arrangement; and
   the flow arrangement being positioned within the fluid flow and in an area of the opening region wherein, when no medium is flowing through the turbine system, the turbine system is arranged in an operating position relative to a tailwater level such that at least approximately 10% of an outlet cross-sectional area of the tubular arrangement is arranged above the tailwater level.

2. The turbine system of claim 1, wherein the tubular arrangement is a suction tube.

3. The turbine system of claim 1, wherein an axis of rotation of the turbine is arranged one of substantially horizontally and inclined with respect to a horizontal reference.

4. The turbine system of claim 1, wherein the turbine comprises a turbine rotor and a plurality of turbine blades rigidly arranged on the turbine rotor.

5. The turbine system of claim 1, wherein the flow arrangement comprises a flow body.

6. The turbine system of claim 5, wherein the tubular arrangement comprises a tube and wherein the flow body is arranged in the tube and in an area of a downstream end of the tube.

7. The turbine system of claim 1, wherein the flow arrangement comprises at least one rib.

8. The turbine system of claim 7, wherein the at least one rib is arranged substantially horizontally.

9. The turbine system of claim 1, wherein the flow arrangement comprises at least one flow body that is arranged substantially vertically.

10. The turbine system of claim 1, wherein the flow arrangement comprises at least one flow body that is arranged substantially inclined with respect to one of a horizontal plane and a vertical plane.

11. The turbine system of claim 1, wherein the flow arrangement comprises at least one rib that is arranged at an angle that is inclined with respect to the fluid flow.

12. The turbine system of claim 1, wherein the flow arrangement comprises at least one pear-shaped body arranged concentrically in the tubular arrangement.

13. The turbine system of claim 12, wherein the at least one pear-shaped body is supported in the tubular arrangement by a plurality of support blades.

14. The turbine system of claim 1, wherein the tubular arrangement at least partially opens out into open air.

15. The turbine system of claim 1, wherein, when no medium is flowing through the turbine system, the turbine system is arranged in an operating position relative to the tailwater level such that at least approximately 25% of an the outlet cross-sectional area of the tubular arrangement is arranged above the tailwater level.

16. The turbine system of claim 1, wherein, when no medium is flowing through the turbine system, the turbine system is arranged in an operating position relative to the tailwater level such that at least approximately 50% of the outlet cross-sectional area of the tubular arrangement is arranged above the tailwater level.

17. The turbine system of claim 1, wherein, when no medium is flowing through the turbine system, the turbine system is arranged in an operating position relative to the tailwater level such that at least approximately 75% of the outlet cross-sectional area of the tubular arrangement is arranged above the tailwater level.

18. The turbine system of claim 1, wherein, when no medium is flowing through the turbine system, the turbine system is arranged in an operating position relative to the tailwater level such that an entirety of the outlet cross-sectional area of the tubular arrangement is arranged above the tailwater level.

19. A turbine system as in claim 1 further comprising a generator driven by the turbine.

20. A turbine-generator module operable at least one of in the environment in which there is the low liquid level and the environment wherein there is no liquid level downstream of the module, the module comprising: a plurality of turbine-generator units according to claim 19; and the plurality of turbine-generator units being arranged at least one of: next to each other; and one above another.

21. The turbine-generator module of claim 20, wherein the tubular arrangements of the turbine-generator units are arranged in a row next to one another, wherein, when no medium flows through the turbine systems, each of the tubular arrangements open out at least partially into the open air.

22. A method of generating electrical energy with the turbine-generator module of claim 20, the method comprising: arranging the turbine-generator module between two stationary structures in a dam installation; and operating the turbines.

23. The method of claim 22, further comprising at least one of raising and lowering the turbine-generator module with a lifting device.

24. The turbine system of claim 1, wherein the flow arrangement comprises at least one flow body that is arranged downstream of the opening region.

25. A method of generating electrical energy with the turbine system of claim 1, the method comprising: arranging the turbine system in a dam installation; and operating the turbine.

26. The method of claim 25, wherein the dam installation comprises one of a weir installation and a lock.

27. A method of generating electrical energy with the turbine system of claim 1, the method comprising: arranging the turbine system in an existing dam installation; and operating the turbine.

28. A turbine system operable in at least one of an environment in which there is a low liquid level and an environment wherein there is no liquid level downstream of a turbine, the system comprising;
the turbine;
a tubular arrangement comprising an opening region, the tubular arrangement being connected to a downstream side of the turbine;
a flow arrangement that at least partially prevents a fluid flow from becoming detached from the tubular arrangement; and
the flow arrangement being positioned within the fluid flow and in an area of the opening region, wherein the flow arrangement comprises two ribs arranged at a distance from one another, whereby the distance between the two ribs is substantially calculated using a formula $v \geq \sqrt{g \cdot h}$, wherein "v" is a flow velocity, "g" is an acceleration due to gravity, and "h" is the distance between the two ribs.

29. A method for operating a turbine system, the method comprising:
connecting a tubular arrangement to a downstream end of a turbine; causing a fluid flow through the tubular arrangement;
maintaining the fluid flow within the tubular arrangement at least partially above a tailwater level immediately following the tubular arrangement;
positioning a flow arrangement within the fluid flow and in an area of an opening region of the tubular arrangement, wherein the fluid flow is at least partially prevented from becoming detached from the tubular arrangement.

30. The method of claim 29, further comprising maintaining the fluid flow immediately downstream of the tubular arrangement at least approximately 10% above the tailwater level.

31. The method of claim 29, further comprising maintaining the fluid flow immediately downstream of the tubular arrangement at least approximately 50% above the tailwater level.

32. The method of claim 29, further comprising maintaining the fluid flow immediately downstream of the tubular arrangement at least approximately 100% above the tailwater level.

33. The method of claim 29, further comprising maintaining the fluid flow immediately downstream of the tubular arrangement at least approximately 300% above the tailwater level.

34. The method of claim 29, further comprising maintaining the fluid flow immediately downstream of the tubular arrangement at least approximately 500% above the tailwater level.

35. The method of claim 29, further comprising locating the tubular arrangement such that the tailwater level that immediately follows the opening region of the tubular arrangement is between below a bottom edge of the tubular arrangement and directly below a top edge of the tubular arrangement.

36. A method for operating a turbine system, the method comprising:
arranging a tubular arrangement on a downstream end of a turbine;
causing a fluid flow through the tubular arrangement;
maintaining at least a top edge of the tubular arrangement above a tailwater level that follows an opening region of the tubular arrangement;
positioning a flow arrangement within the fluid flow and in an area of the opening region, whereby the fluid flow is at least partially prevented from becoming detached from the tubular arrangement.

37. The method of claim 36, wherein the maintaining comprises locating the tubular arrangement such that the tailwater level that follows the opening region of the tubular arrangement is between below a bottom edge of the tubular arrangement and directly below the top edge of the tubular arrangement.

38. A method for generating electrical energy with a turbine-generator unit, the method comprising:
causing a fluid flow through a tubular arrangement of the turbine-generator unit;
maintaining at least a top edge of the tubular arrangement above a tailwater level that follows an opening region of the tubular arrangement; and
positioning a flow arrangement within the fluid flow and in an area of the opening region, whereby the fluid flow is at least partially prevented from becoming detached from the tubular arrangement.

39. A method for generating electrical energy with a turbine-generator unit, the method comprising;
causing a fluid flow through a tubular arrangement of the turbine-generator unit;
maintaining at least a top edge of the tubular arrangement above a tailwater level that follows an opening region of the tubular arrangement, wherein the maintaining comprises locating the tubular arrangement such that the tailwater level that follows the opening region of the tubular arrangement is between below a bottom edge of the tubular arrangement and directly below the top edge of the tubular arrangement, and
positioning a flow arrangement within the fluid flow and in an area of the opening region, whereby the fluid flow is at least partially prevented from becoming detached from the tubular arrangement.

40. A turbine system comprising:
a turbine;
a tubular arrangement comprising an exit opening; the tubular arrangement being arranged on a downstream side of the turbine;
at least one flow controlling rib that at least partially prevents a fluid flow through the tubular arrangement from becoming detached from the tubular arrangement; and
the at least one flow controlling rib being positioned within the fluid flow and in an area of the exit opening, wherein at least an upper edge of the exit opening is arranged above a tailwater level immediately following the exit opening.

* * * * *